No. 661,701. Patented Nov. 13, 1900.
F. G. MIX.
PACKING CASE.
(Application filed Aug. 10, 1900.)
(No Model.) 2 Sheets—Sheet 1.
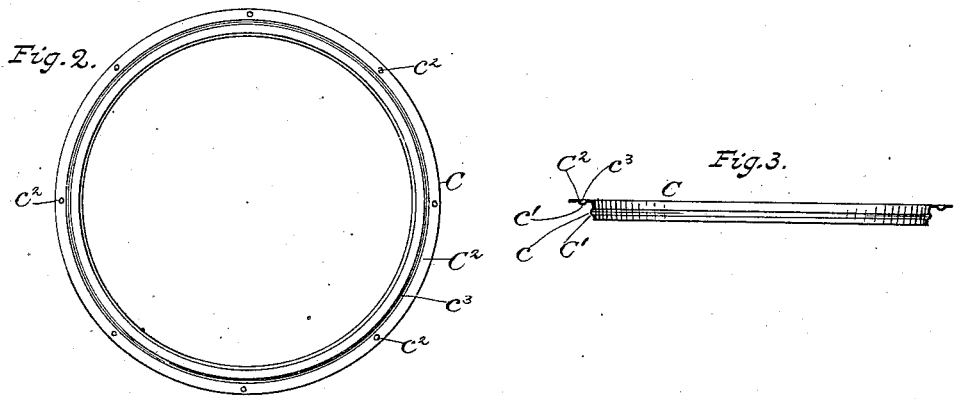
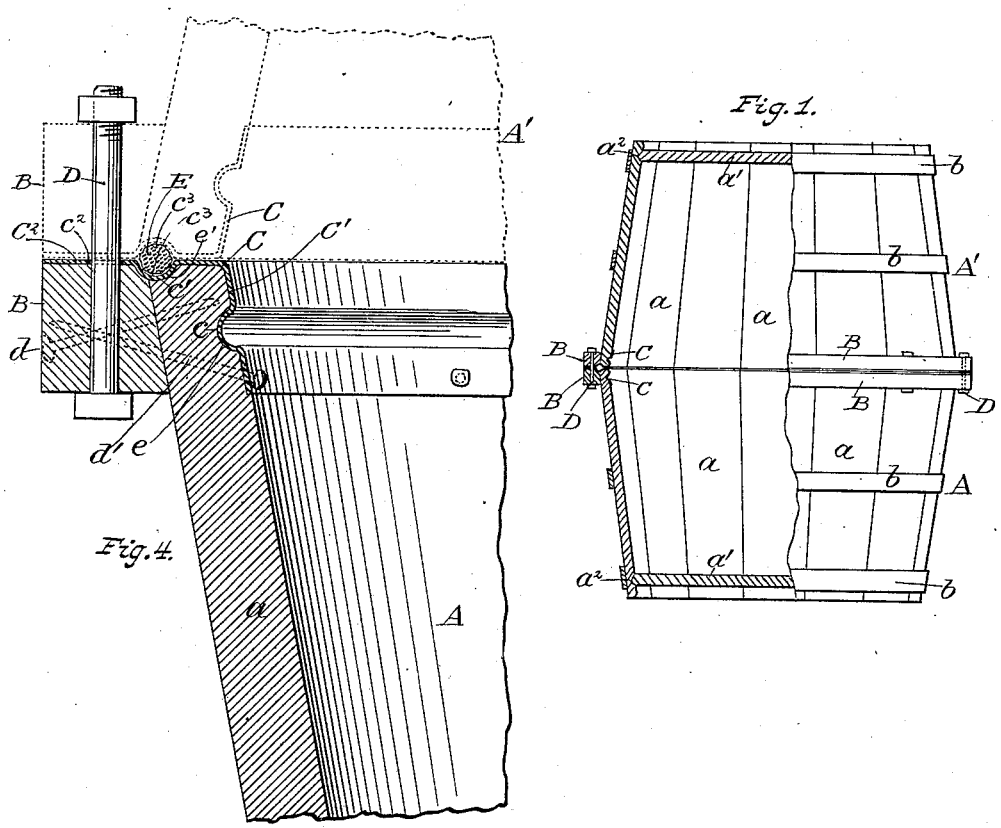
Witnesses, Frank G. Mix, Inventor No. 661,701. Patented Nov. 13, 1900.
F. G. MIX.
PACKING CASE.
(Application filed Aug. 10, 1900.)
(No Model.) 2 Sheets—Sheet 2.
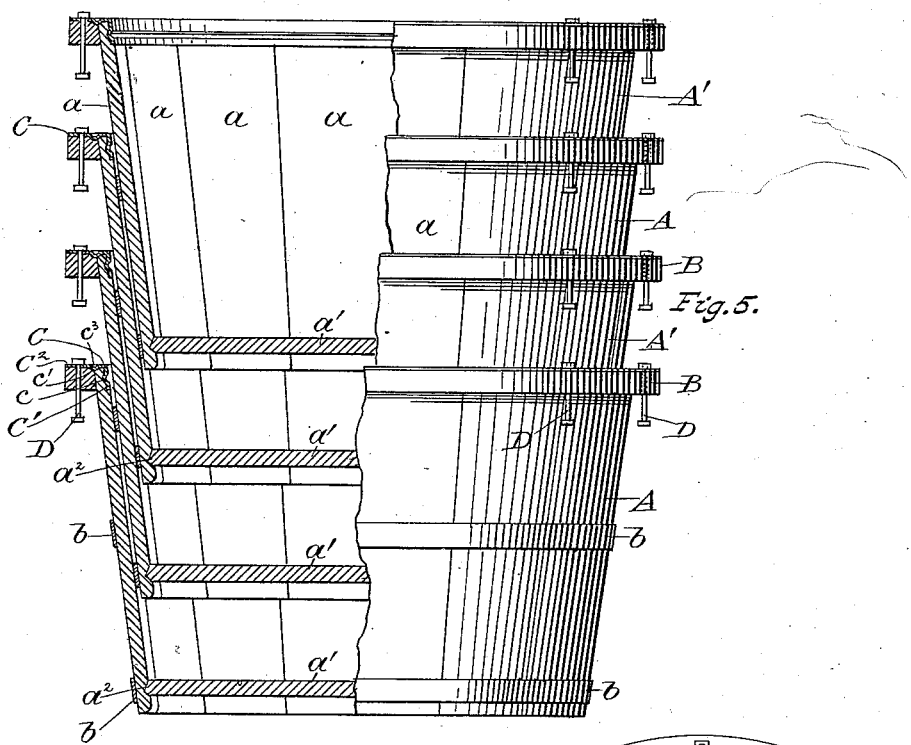
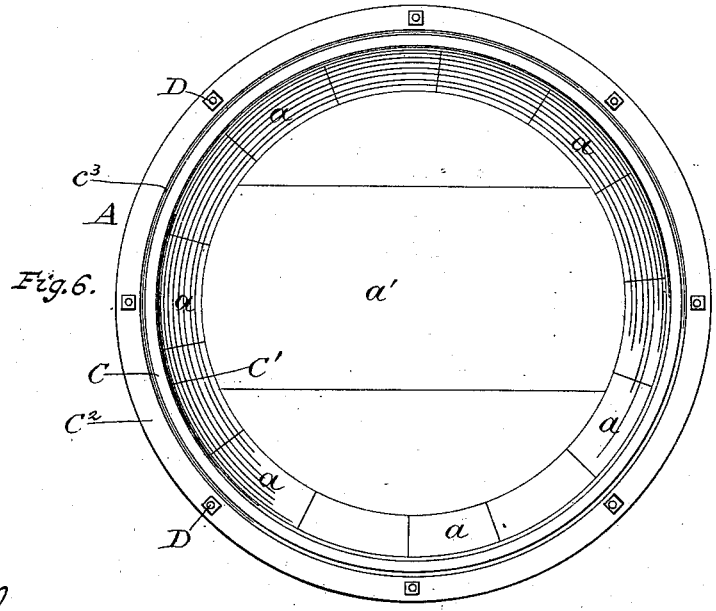
Witnesses
Charles Selkirk
Lewis T. Newell
Frank G. Mix
Inventor
by Alex. Selkirk,
Attorney

UNITED STATES PATENT OFFICE.

FRANK G. MIX, OF SCHOHARIE, NEW YORK.

PACKING-CASE.

SPECIFICATION forming part of Letters Patent No. 661,701, dated November 13, 1900.

Application filed August 10, 1900. Serial No. 26,462. (No model.)

*To all whom it may concern:*

Be it known that I, FRANK G. MIX, a citizen of the United States, and a resident of Schoharie, in the county of Schoharie and State of New York, have invented new and useful Improvements in Packing-Cases, of which the following is a specification.

My invention relates to a packing-case which is sectional in character; and it consists in the novel construction hereinafter fully described, and set forth in the claims.

The object of my invention is to produce a sectional packing-case for use for transportation of fruits, vegetable products, cement, lime, and other products of manufacture to markets or consignees and be adapted to be readily opened for access to its contents and also adapted to have parts or sections thereof and those of one or more like packages nested together in compact form for return for reuse or for transportation as empties on cars or boats.

Other objects and advantages of the invention will be fully understood from the following description and claims when taken in connection with the annexed drawings, forming a part of this specification, in which—

Figure 1 is an elevation, partly in section, of a packing-case embodying my invention. Fig. 2 is a plan of one of a pair of coacting coupling devices employed in my invention. Fig. 3 is a section of the same. Fig. 4 is an enlarged view illustrating the coupling devices for uniting the parts or sections of my improved packing-case, its adjuncts, and manner or means for securing it in place in its section. Fig. 5 is an elevation of nested sections of several similar packing-cases with parts in section and illustrating said several similar packing-cases nested as empties for transportation, and Fig. 6 is a plan of the same.

Similar letters of reference refer to similar parts throughout the several views.

In the drawings, A A' are two parts or sections which are shown to comprise my improved packing-case, which parts or sections are shown to be circular in form in a horizontal direction; yet they may be made with square or other suitable form, as may be found to be advantageous, while these parts or sections A A' are shown to be tapering in their vertical direction to such a suitable degree as to adapt several parts of two or more similar packing-cases to be nested together, one within the other, when empty, as shown in Fig. 5. In Fig. 1 this packing-case is shown to be in the form of a barrel and having each part made of staves $a\,a$, made with suitable joints and having each a suitable head $a'$, which is preferably held in place in the chime end of said staves by a croze-groove $a^2$, as generally practiced in barrels; yet the said heads $a'$ may be otherwise secured in place in the outer and more contracted ends of said parts A A' when preferred. These staves $a\,a$ of said parts or sections are shown to be bound together by means of hoops B and $b$.

C C are coupling devices made of thin metal and with a form in horizontal direction corresponding with the form of the larger or flared ends of sections A A', respectively, to be coupled together. These coupling devices C C are each a duplicate of the other, and a description of one will suffice for that of the other. This coupling device C (shown in Figs. 1, 2, and 3 and in section on enlarged scale, in Fig. 4) comprises the stave-engaging web member $C'$ and coupling web member $C^2$, integral with the former and made of thin metal, either by casting, striking-up, spinning, or other operations, or from straight strips of thin metal rolled in shape and bent in form for correspondence with the flaring end of the packing-case it is to be applied to. The stave-engaging web member $C'$ is shown to be inclined in correspondence with the inclination of the inner sides of the stave $a$ and has made with it, between its line of lower edge and its line of union with the coupling web member $C^2$, the annular stave-engaging tongue $c$, which projects outwardly to a suitable distance from the plane of the outer side of said web $C'$, as shown in Figs. 3 and 4, to adapt it to enter a corresponding groove provided in the staves $a$ from their inner sides, as shown in Fig. 4. Although this stave-engaging tongue $c$ may be made with any suitable form, as angular or squared, yet I prefer it to be convex in form, as shown. The coupling web member $C^2$ turns horizontally from the vertical inclined stave-engaging web member $C'$ with which it is integral, and is provided with the stave-holding tongue $c'$, which is shown to project in direction of the extension of the staves $a$ from this web member $C^2$ and in a line transverse to the line of projection of tongue $c$ of web member $C'$. This stave-holding tongue $c'$ may be angular or square in form; yet I prefer to make it with convex form, as shown in Fig. 4, and with a projection to adapt it to have sufficient bearing on the stave in direction toward the axial line of the packing-case, to adapt it to serve the purpose of a hoop applied to the circumferential outer surface of the series of staves $a$ comprising the wall of the said packing-case. This horizontal coupling web member $C^2$ is provided with bolt-receiving holes $c^2 c^2$ in sufficient number, arranged equidistant apart, as illustrated in Fig. 2, which holes are in a circular line outside of the circular line of the stave-holding tongue $c'$, as shown in the same figure. When the packing-case is designed to be water or dust tight, as might be required in packing-cases for holding liquids or lime, cement, or other substance liable to be in part or wholly dust or powder in form, I provide in the coupling web member $C^2$, from its outer or coupling side, a suitable gasket-receiving groove $c^3$, which may be located at any line between the row of bolt-holes $c^2$ and line of union of web member $C^2$ with the stave-engaging web member $C'$; yet I prefer to make said groove $c^3$ opposite to the tongue $c'$, when both said tongue and groove may be produced at the same time when the coupling device is made from thin sheet metal.

The upper end portions of the walls of each part or section A A' of this sectional packing-case are provided with groove $e$, Fig. 4, which is sunken in the staves $a$ $a$ from their inner sides all around and is adapted to nicely receive the annular tongue $c$, provided with the inclined stave-engaging web member $C'$, as shown in Fig. 4. A groove $e'$ is also provided in the upper end portion of the wall of each section of this packing-case, which groove is sunken in said walls from their horizontal-edge surfaces, as shown in Fig. 4, so as to adapt it to nicely receive the stave-holding tongue $c'$, provided with the coupling web member $C^2$. This groove $e'$ may be wholly sunken into the wall from its end edge or be in part sunken therein and in part outside the end portion of the staves $a$, as shown in Fig. 4, so that a portion of the groove $e'$ may occur in the inner upper corner of hoop B, as shown in the same figure. The hoop B is made with sufficient depth and of wood and with its inner side beveled to correspond with the incline of the sides of staves $a$, on which said hoop has bearing, and it is made with a width corresponding with the projection of the web member $C^2$ outwardly past the line of outer side of the staves where they abut against said web member, so that the outer side of said hoop B may be of diameter corresponding with the outside diameter of said web member $C^2$, so that said hoops B of two joined sections A A' will be adapted to protect the edges of the web members $C^2 C^2$ from being bent out of shape when the packing-case is being handled or is in storage or transportation. The hoops B are each perforated at intervals for registration with the bolt-holes $c^2 c^2$ in the web members $C^2$, as shown in Fig. 4, for receiving coupling-bolts D D. Hoops B B may be secured in place at the flaring ends of the side walls of sections A A' by means of nails $d$, driven through the wood of the hoop and into the staves $a$ at suitable distances apart, and also be further secured by means of nails $d'$, driven through suitable holes provided in the lower margin of the web members $C'$ and through staves $a$ and into said hoop, as indicated by dotted lines in Fig. 4.

E is a gasket employed between the web members $C^2 C^2$ of the coupling devices C C and retained in place by grooves $c^3 c^3$, provided in said web members $C^2$. This gasket may be of any suitable substance which is adapted to produce a water or dust tight joint between the said coupling devices.

Although the drawings show the walls of sections A A' made of staves $a$, of wood, and having closing-heads $a'$, also of wood, yet said walls may be made of any other suitable material in which grooves for receiving tongues $c c'$ of said coupling devices C C and also be adapted to have the hoops B secured thereto for reinforcing the horizontal web members $C^2$ of the coupling devices for the purposes described.

By my above-described construction and arrangements of parts this packing-case may be cheaply constructed in a substantial manner, so as to adapt it for repeated use for containing fruits, farm and garden products, and manufactured products—such as flour, lime, cement, or other articles used in large quantities and required to be transported and stored in packages—and when empty the sections may be readily nested together, as shown in Fig. 5, so as to be returned to the producer as empties at low cost for freightage of the same.

Having described my invention, what I claim and desire to secure by Letters Patent, is—

1. In a coupling for a sectional packing-case, the combination of two coupling devices C C, of circumferential form for correspondence with the portions of the sections of a packing-case they are to be applied to, made of thin metal and each a duplicate of the other and having each the web member $C^2$, which is adapted to parallel with that of the other and provided with registering coupling-bolt holes, and the web member $C'$ integral with web member $C^2$ and turned at an angle to the latter and having correspondence with the inner surface of the side walls of the portion of the section to which they, respectively, may be secured, each web member $C'$ having tongue c projected therefrom in direction of the web member $C^2$ and adapted to hold with a groove provided in the inner side of the side walls of the section applied to, and each web member $C^2$ having a tongue $c'$ projected therefrom in direction web member $C'$ is projected and adapted to hold with the substance of the end edge of the section said web member may be seated on, all substantially as and for the purposes set forth.

2. In a sectional packing-case, the combination with each of the two sections A and A' thereof, having groove $e$ in its inner side end margin of wall portion at a suitable distance below its open end edge, of one of two similar coupling devices C made of thin metal and provided with web member $C'$ having tongue $c$ projected from its outer circumferential side and having its form and outer circumference in correspondence with that of the inner side of the open end wall portion and said groove therein whereby said web member may nicely fit said wall portion and its tongue enter and hold with the said groove therein, and also provided with web member $C^2$ integral with web member $C'$ and turned outwardly at right angles to the axial line of the latter and provided with tongue $c'$ projected in direction the said web member is projected from the horizontal plane of said web member $C^2$ and having in it a series of bolt-holes $c^2$, and hoop B of wood, secured as described in place on the circumferential outer end margin of the side walls of said section and abutting against the tongue side of said web member $C^2$ while said tongue $c'$ is holding with the substance of the end edge of said walls, and coupling-bolts D, whereby each of the said two sections may have securely fixed with it a reinforced coupling device in correspondence with that secured to the other section and the two said sections be adapted to be coupled and uncoupled at pleasure, substantially as and for the purposes set forth.

FRANK G. MIX.

Witnesses:
ALEX. SELKIRK,
CHARLES SELKIRK.